(12) United States Patent  
Kawamura

(10) Patent No.: US 11,599,722 B2  
(45) Date of Patent: Mar. 7, 2023

(54) PREDICTION MODEL GENERATING APPARATUS, TRAVEL SUITABILITY PREDICTING APPARATUS, PREDICTION MODEL GENERATING METHOD, TRAVEL SUITABILITY PREDICTING METHOD, PROGRAM, AND RECORDING

(71) Applicant: NEC Solution Innovators, Ltd., Tokyo (JP)

(72) Inventor: Taketo Kawamura, Tokyo (JP)

(73) Assignee: NEC Solution Innovators, Ltd., Tokyo (JP)

(*) Notice: Subject to any disclaimer, the term of this patent is extended or adjusted under 35 U.S.C. 154(b) by 263 days.

(21) Appl. No.: 16/857,779

(22) Filed: Apr. 24, 2020

(65) Prior Publication Data  
US 2020/0342170 A1    Oct. 29, 2020

(30) Foreign Application Priority Data

Apr. 26, 2019   (JP) .............................. JP2019-085732

(51) Int. Cl.  
*G06F 40/20*     (2020.01)  
*G06F 40/205*    (2020.01)  
*G06F 40/279*    (2020.01)  
*G06F 40/289*    (2020.01)  
*G06F 40/268*    (2020.01)  
(Continued)

(52) U.S. Cl.  
CPC ......... *G06F 40/268* (2020.01); *G06K 9/6267* (2013.01); *G06N 20/00* (2019.01)

(58) Field of Classification Search  
USPC .................................. 382/154–229; 706/1–21  
See application file for complete search history.

(56) References Cited

U.S. PATENT DOCUMENTS

| 9,633,007 | B1 | 4/2017 | Brun et al. |
| 9,639,842 | B1 * | 5/2017 | Green .................. G06Q 10/025 |
| 10,437,867 | B2 | 10/2019 | Hashimoto et al. |

(Continued)

FOREIGN PATENT DOCUMENTS

| CN | 106875066 | * | 6/2017 | ............. G06Q 10/04 |
| JP | 2011-145834 A | | 7/2011 | |
| JP | 2019-032857 A | | 2/2019 | |

OTHER PUBLICATIONS

US Office Action for U.S. Appl. No. 16/857,976, dated Jul. 8, 2022.

(Continued)

*Primary Examiner* — Marcellus J Augustin  
(74) *Attorney, Agent, or Firm* — Sughrue Mion, PLLC

(57) ABSTRACT

In a prediction model generating apparatus 1, data obtaining unit 11 obtains text data; variable group classifying unit 12 classifies the data into a plurality of variable groups; variable scoring unit 13 scores the data of at least one of the plurality of variable groups by associating that data with the data of another group; variable input unit 14 takes the data of the scored group as a response variable, and the data of the other group associated with the scored group as an explaining variable, and inputs those data to machine learning unit 15. The machine learning unit 15 generates, through machine learning, a prediction model predicting the response variable from the explaining variable.

13 Claims, 11 Drawing Sheets

(51) Int. Cl.
  *G06N 20/00*    (2019.01)
  *G06K 9/62*     (2022.01)

(56) References Cited

U.S. PATENT DOCUMENTS

| | | | |
|---|---|---|---|
| 2015/0073839 A1* | 3/2015 | Alharbi | G06Q 10/02 |
| | | | 705/5 |
| 2015/0161665 A1* | 6/2015 | Grimes | G06Q 30/0261 |
| | | | 705/14.58 |
| 2015/0186792 A1* | 7/2015 | Chidlovskii | G06Q 50/26 |
| | | | 706/12 |
| 2015/0278970 A1* | 10/2015 | Valverde, Jr. | G06Q 50/14 |
| | | | 705/26.7 |
| 2017/0018033 A1* | 1/2017 | Lee | G06Q 40/06 |
| 2017/0069201 A1* | 3/2017 | Sedlik | G07B 15/063 |
| 2017/0091816 A1 | 3/2017 | Moreau et al. | |
| 2018/0081871 A1 | 3/2018 | Williams et al. | |
| 2018/0239815 A1 | 8/2018 | Yi et al. | |
| 2019/0026264 A1* | 1/2019 | Oshima | G06F 16/316 |
| 2019/0036264 A1* | 1/2019 | Chien | H01R 13/405 |
| 2019/0080362 A1* | 3/2019 | Acuna Agost | G06Q 30/0275 |
| 2019/0171660 A1 | 6/2019 | Kershaw et al. | |
| 2020/0175610 A1* | 6/2020 | Pikle | G06N 20/00 |

OTHER PUBLICATIONS

U.S. Office Action and PTO-892 for U.S. Appl. No. 16/857,976 dated Dec. 20, 2021.

* cited by examiner

Positive-negative table

| ID | Word | P/N | ID | Word | P/N |
|---|---|---|---|---|---|
| A1 | Rain | N | B1 | Kind | P |
| A2 | Sunny | P | B2 | Nice | P |
| A3 | Pleasant | P | B3 | Tired | N |
| A4 | Typhoon | N | B4 | Laughs | P |
| A5 | Strong wind | N | B5 | Quiet | N |
| A6 | Cool | P | B6 | Terrible | N |
| A7 | Hot | N | B7 | Satisfied | P |

FIG. 5

Score table P=1, N=-1

| Explaining variable | Explaining variable | Number of P-words | Number of N-words | Score |
|---|---|---|---|---|
| Visitor to Japan A (China) | Guide A | 10 | 2 | 8 |
| Visitor to Japan B (USA) | Guide B | 5 | 0 | 5 |
| Visitor to Japan C (Korea) | Guide C | 1 | 1 | 0 |
| Visitor to Japan D (England) | Guide D | 12 | 0 | 12 |
| Visitor to Japan E (France) | Guide E | 3 | 0 | 3 |
| Visitor to Japan F (Canada) | Guide F | 1 | 2 | -1 |
| Visitor to Japan G (India) | Guide G | 7 | 1 | 6 |

FIG. 6

Recommendation details

| Recommendation rank | Guide name | Recommended spot 1 | Recommended spot 2 | Recommended spot 3 | Recommended spot 4 | Recommended spot 5 |
|---|---|---|---|---|---|---|
| 1 | Guide A | a1 | a2 | a3 | a4 | a5 |
| 2 | Guide B | b1 | b2 | b3 | b4 | b5 |
| 3 | Guide C | c1 | c2 | c3 | c4 | c5 |
| 4 | Guide D | d1 | d2 | d3 | d4 | d5 |
| 5 | Guide E | e1 | e2 | e3 | e4 | e5 |

FIG. 11

PREDICTION MODEL GENERATING APPARATUS, TRAVEL SUITABILITY PREDICTING APPARATUS, PREDICTION MODEL GENERATING METHOD, TRAVEL SUITABILITY PREDICTING METHOD, PROGRAM, AND RECORDING

INCORPORATION BY REFERENCE

This application claims priority from Japanese Patent Application No. 2019-085732 filed on Apr. 26, 2019. The entire subject matter of the Japanese Patent Application is incorporated herein by reference.

TECHNICAL FIELD

The present invention relates to a prediction model generating apparatus, a travel suitability predicting apparatus, a prediction model generating method, a travel suitability predicting method, a program, and a recording medium.

BACKGROUND ART

With respect to travel, techniques for recommending various travel details have been developed. For example, Patent Literature 1 discloses a technique that enables useful information to be provided to a traveler during a trip without requiring requests, location information, and so on from an information terminal carried by the traveler.

CITATION LIST

Patent Literature

Non Patent Literature

Patent Literature 1: JP 2011-145834A

SUMMARY

A prediction model generating apparatus includes a data obtaining unit, a variable group classifying unit, a variable scoring unit, a variable input unit, and a machine learning unit. The data obtaining unit obtains data. The variable group classifying unit classifies the data into a plurality of variable groups. The variable scoring unit scores the data of at least one of the plurality of variable groups by associating that data with the data of another group. The variable input unit takes the data of the scored group as a response variable, and the data of the other group associated with the scored group as an explaining variable, and inputs those data to the machine learning unit. The machine learning unit generates, through machine learning, a prediction model predicting the response variable from the explaining variable.

A prediction model generating method includes a data obtaining step, a variable group classifying step, a variable scoring step, a variable input step, and a machine learning step. The data obtaining step obtains data. The variable group classifying step classifies the data into a plurality of variable groups. The variable scoring step scores the data of at least one of the plurality of variable groups by associating that data with the data of another group. The variable input step takes the data of the scored group as a response variable, and the data of the other group associated with the scored group as an explaining variable, and inputs those data to a machine learning unit. The machine learning step generates, through machine learning, a prediction model predicting the response variable from the explaining variable.

BRIEF DESCRIPTION OF DRAWINGS

FIG. 5 is a chart illustrating an example of a positive-negative table in the apparatus according to Example Embodiment 2.

FIG. 6 is a chart illustrating an example of a score table in the apparatus according to Example Embodiment 2.

FIG. 11 is a chart illustrating an example of details of a recommendation in an apparatus according to Example Embodiment 2.

EXAMPLE EMBODIMENT

Figure 1:
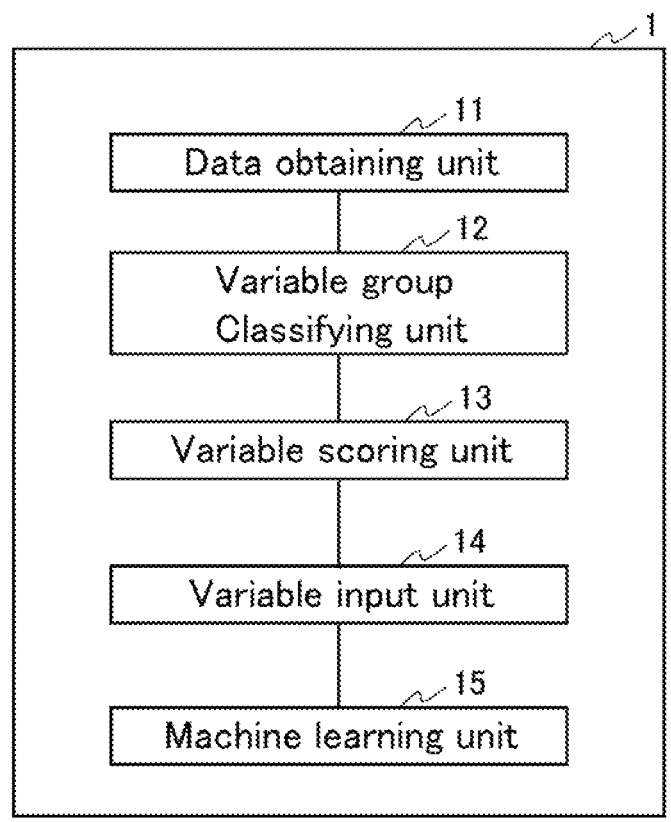
FIG. 1 is a block diagram illustrating the configuration of an example of an apparatus according to Example Embodiment 1.

According to one aspect, in the prediction model generating apparatus, the variable scoring unit may include a word-level evaluation reference table and a word extraction counting unit. The word-level evaluation reference table may include a level evaluation reference for each of words. The data obtaining unit may obtain text data as the data. The variable group classifying unit may classify the text data into a plurality of variable groups. The word extraction counting unit may extract, from the text data in the variable groups, a word that is the same as a word in the word-level evaluation reference table, and count the number of the extracted word. The variable scoring unit may score the data of the group on the basis of the counted number of the extracted word and the level evaluation reference in the word-level evaluation reference table.

In the prediction model generating apparatus according to the stated aspect, the word extraction counting unit may extract, from the text data in the variable groups, a word in the word-level evaluation reference table and a word that is the same as a synonym of the word, and count the number of the extracted word.

According to one aspect, in the prediction model generating apparatus, the variable scoring unit may include a word-level evaluation reference table generating unit. The word-level evaluation reference table generating unit may use morphological analysis to break down a plurality of Japanese text data obtained by the data obtaining unit into words, extract a word that is the same as a word included in a Japanese sentiment polarity dictionary (volume of terms), and associate the extracted word with evaluation information for the word in the Japanese sentiment polarity dictionary in a table.

According to one aspect, in the prediction model generating apparatus, the data obtained by the data obtaining unit may be travel detail data, traveler data, and travel guide data, and the variable group classifying unit may classify the travel detail data as a travel detail variable, classify the traveler data as a traveler variable, and classify the travel guide data as a travel guide variable. The apparatus according to this aspect can be called a "travel suitability prediction model generating apparatus".

A travel suitability predicting apparatus is an apparatus including a prediction model generated by the travel suitability prediction model generating apparatus, and is an apparatus that predicts a suitability of at least two of travel details, a traveler, and a travel guide.

According to one aspect, the travel suitability predicting apparatus may further include a recommending unit.

According to one aspect, in the prediction model generating method, the variable scoring step may include a word extraction counting step using a word-level evaluation reference table. The word-level evaluation reference table may include a level evaluation reference for each of words. The data obtaining step may obtain text data as the data. The variable group classifying step may classify the text data into a plurality of variable groups. The word extraction counting step may extract, from the text data in the variable groups, a word that is the same as a word in the word-level evaluation reference table, and count the number of the extracted word. The variable scoring step may score the data of the group on the basis of the counted number of the extracted word and the level evaluation reference in the word-level evaluation reference table.

In the prediction model generating method according to the stated aspect, the word extraction counting step may extract, from the text data in the variable groups, a word in the word-level evaluation reference table and a word that is the same as a synonym of the word, and count the number of the extracted word.

According to one aspect, in the prediction model generating method, the variable scoring step may include a word-level evaluation reference table generating step. The word-level evaluation reference table generating step may use morphological analysis to break down a plurality of Japanese text data obtained in the data obtaining step into words, extract a word that is the same as a word included in a Japanese sentiment polarity dictionary (volume of terms), and associate the extracted word with evaluation information for the word in the Japanese sentiment polarity dictionary in a table.

According to one aspect, in the prediction model generating method, the data obtained in the data obtaining step may be travel detail data, traveler data, and travel guide data, and the variable group classifying step may classify the travel detail data as a travel detail variable, classify the traveler data as a traveler variable, and classify the travel guide data as a travel guide variable. The method according to this aspect can be called a "travel suitability prediction model generating method".

A travel suitability predicting method is a method that predicts a suitability of at least two of travel details, a traveler, and a travel guide using a prediction model generated through the travel suitability prediction model generating method.

According to one aspect, the travel suitability predicting method may further include a recommending step.

A program is a program configured to execute at least one of the prediction model generating method and the travel suitability predicting method.

A recording medium is a computer-readable recording medium in which the program is recorded.

Embodiments will be described next with reference to the drawings, but the invention is not intended to be limited to the following embodiments. In the drawings, parts that are the same will be given the same reference signs. Furthermore, unless otherwise specified, the descriptions of individual embodiments can be applied to each other, and unless otherwise specified, the configurations described in the embodiments can be combined.

Example Embodiment 1

FIG. 1 is a block diagram illustrating the configuration of an example of a prediction model generating apparatus 1 according to the present example embodiment. As illustrated in FIG. 1, a main apparatus 1 includes a data obtaining unit 11, a variable group classifying unit 12, a variable scoring unit 13, a variable input unit 14, and a machine learning unit 15.

Although the format of the main apparatus 1 is not particularly limited, a server, a personal computer (PC, e.g., a desktop PC or a laptop PC), and the like can be given as examples. Additionally, the included unit 11 to 15 of the main apparatus 1 may be in a format where individual apparatuses are connected over a network (a communication line network).

Figure 2:
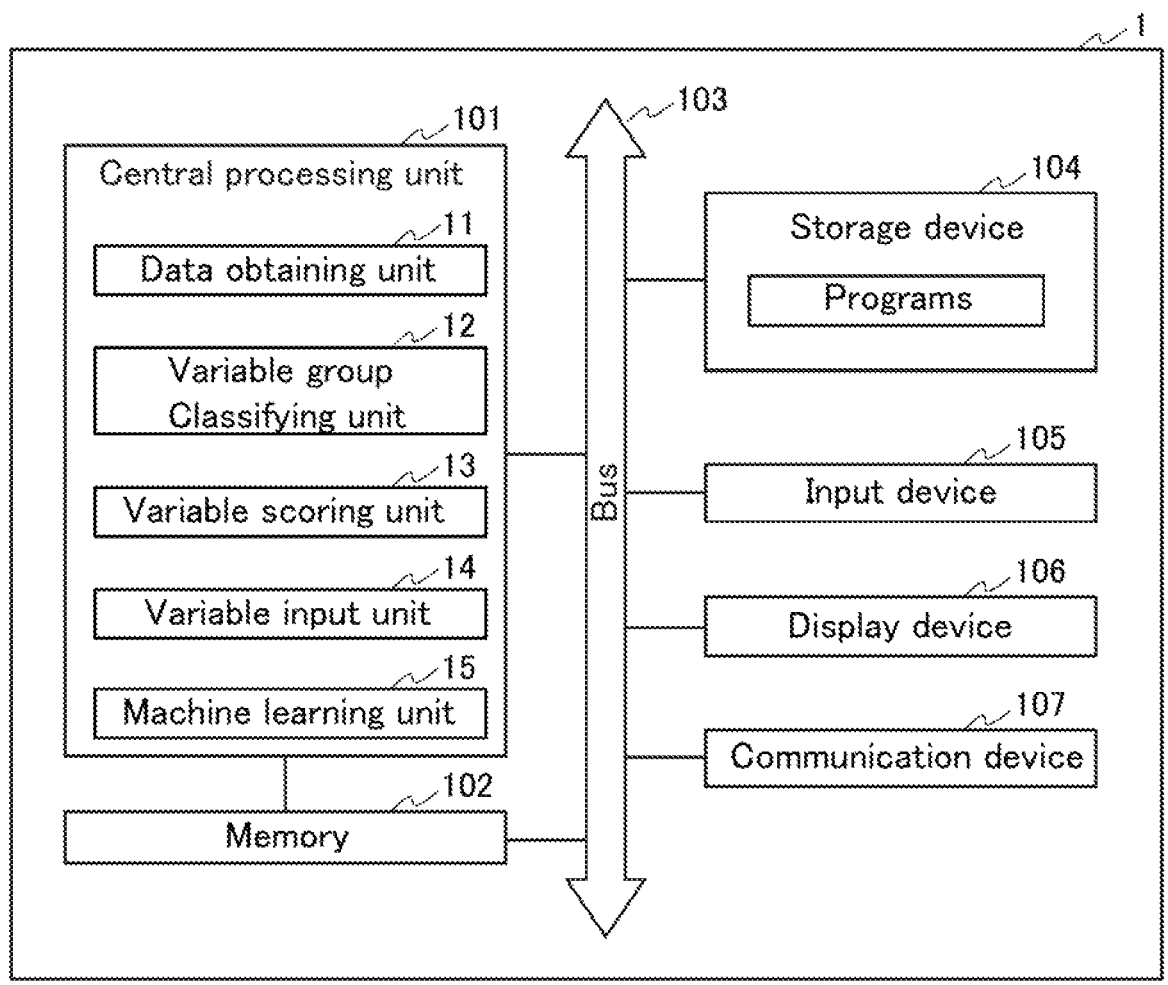
FIG. 2 is a block diagram illustrating an example of the hardware configuration of the apparatus according to Example Embodiment 1.

FIG. 2 is a block diagram illustrating an example of the hardware configuration of the main apparatus 1. The main apparatus 1 includes, for example, a central processing unit (CPU, GPU, or the like) 101, memory 102, a bus 103, a storage device 104, an input device 105, a display device (display) 106, a communication device 107, and so on. The various units of the main apparatus 1 are connected to each other by respective interfaces (I/Fs) via the bus 103.

The central processing unit 101 controls the main apparatus 1 as a whole. In the main apparatus 1, for example, the aforementioned program, other programs, and the like are executed, various types of information are read and written, and so on by the central processing unit 101. Specifically, the central processing unit 101 functions as the data obtaining unit 11, the variable group classifying unit 12, the variable scoring unit 13, the variable input unit 14, and the machine learning unit 15, for example. Note that machine learning is carried out in the main apparatus 1, and the central processing unit 101 is therefore a GPU, for example.

A bus 103 can also connect to an external device, for example. An external storage device (an external database or the like), a printer, and so on can be given as examples of the external device. The main apparatus 1 can connect to an external network (communication line network) through the communication device 107 connected to the bus 103, for example, and can also connect to another apparatus or device via the external network. An administrator terminal (a PC, a server, a smartphone, a tablet, or the like) can be given as an example of the other apparatus.

The main apparatus 1 further includes the input device 105 and the display 106, for example. The input device 105 is a touch panel, a keyboard, a mouse, or the like, for example. An LED display, a liquid crystal display, and the like can be given as examples of the display 106.

In the main apparatus 1, the memory 102 and the storage device 104 can also store access information and log information from an administrator, as well as information obtained from an external database (not shown).

In the main apparatus 1, the data obtaining unit 11 obtains data over the external network through the communication device 107, for example. An Internet line, the World Wide Web (WWW), a telephone line, a local area network (LAN), delay tolerant networking (DTN), and the like can be given as examples of the external network. The communication by the communication device 107 may use a wire or be wireless. Wireless Fidelity (Wi-Fi), Bluetooth (registered trademark), and so on can be given as examples of wireless communication. A format in which apparatuses communicate directly with each other (ad-hoc communication) or communicate indirectly via an access point may be used for the wireless communication.

Main memory (a main storage device) can be given as an example of the memory 102. The main memory is random access memory (RAM), for example. The memory 102 may be read-only memory (ROM), for example. The storage device 104 may be a combination of a storage medium and a drive that reads from and writes to the storage medium, for example. The storage medium is not particularly limited, and may be either internal or external; a hard disk (HD), a CD-ROM, a CD-R, a CD-RW, a MO, a DVD, a flash memory, a memory card, and the like can be given as examples. The storage device 104 may be a hard disk drive (HDD) that integrates a storage medium with the drive, for example.

Figure 3:
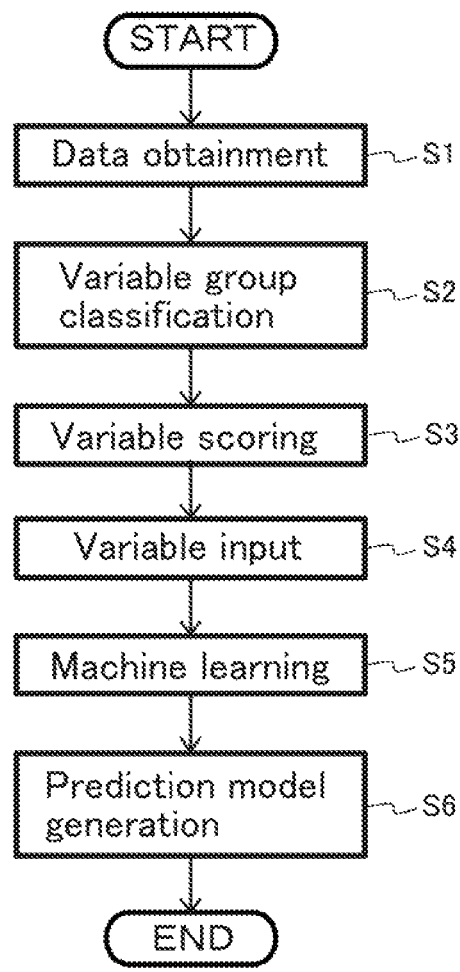
FIG. 3 is a flowchart illustrating an example of processing performed in the apparatus according to Example Embodiment 1.

The flowchart in FIG. 3 illustrates an example of processing carried out by the main apparatus 1. First, the data obtaining unit 11 obtains data (S1). The variable group classifying unit 12 then classifies the data into a plurality of variable groups (S2). The variable scoring unit 13 then scores the data of at least one of the plurality of variable groups by associating that data with the data of another group (S3). The variable input unit 14 takes the data of the scored group as a response variable, and the data of the other group associated with the scored group as an explaining variable, and inputs those data to the machine learning unit 15 (S4). The machine learning unit 15 uses machine learning (S5) to generate a prediction model predicting a response variable from an explaining variable (S6).

The machine learning is not particularly limited, and learning (deep learning) using decision trees, random forests, neural networks, or the like can be used, for example.

Example Embodiment 2

An example of a travel suitability predicting apparatus will be described next with reference to FIGS. 4 to 11.

Figure 4:
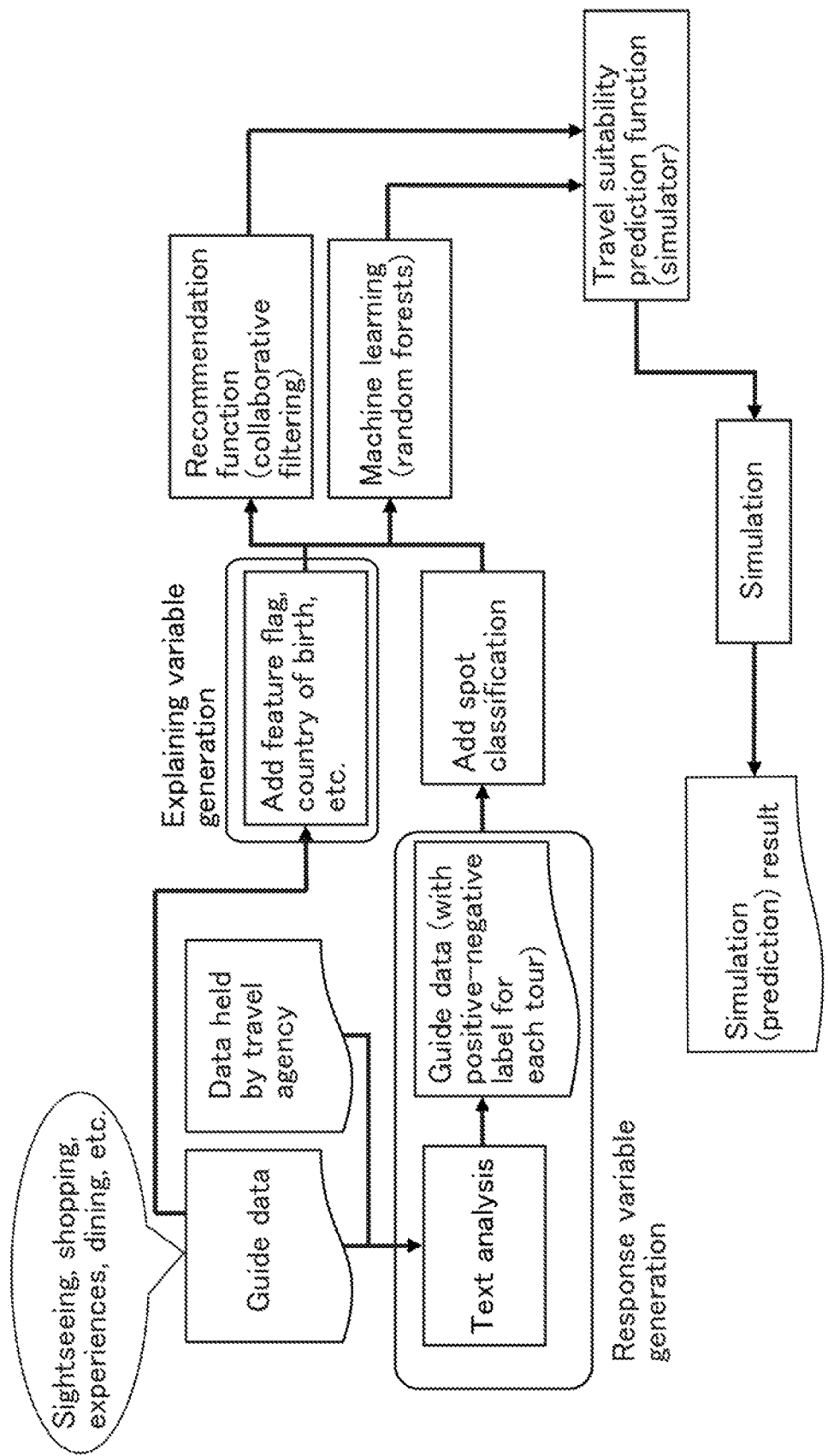
FIG. 4 is a schematic diagram illustrating an example of a concept of an apparatus according to Example Embodiment 2.

FIG. 4 illustrates a concept of the travel suitability predicting apparatus (simulator). The following will describe an example in which the data obtaining unit 11 obtains text data as the data. As illustrated in FIG. 4, the data obtaining unit 11 obtains guide data (text data from guide reports) and text data held by travel agencies, and carries out text analysis (variable group classification and variable scoring). Guide report data such as sightseeing details, shopping, experiences (reviews), dining, and so on can be given as examples of the guide data. Data of travel details (destinations, transportation, terms, costs, and so on), guide data, traveler data, and so on can be given as examples of the data held by travel agencies. In the text analysis, for example, variable guide data with a positive-negative label is created for each of tours, on the basis of a positive-negative table (a word-level evaluation reference table). In this example, the variable guide data serves as a response variable.

FIG. 5 illustrates an example of the positive-negative table. In FIG. 5, an identification sign (ID) is given to each of words, which are denoted as positive (P) or negative (N) and used as a reference for a positive-negative determination. For example, the word "rain", with an ID of A1, is negative (N), whereas the word "sunny", with an ID of A2, is positive.

The word-level evaluation reference table may carry out a two-level evaluation as with the positive-negative table, but is not limited thereto, and may instead carry out a multi-level evaluation such as a three-level evaluation, a five-level evaluation, or the like.

The positive-negative table is not particularly limited, and may use, for example, the "Japanese Sentiment Polarity Dictionary (Volume of Terms)" (Nozomi Kobayashi, Kentaro Inui, Yuji Matsumoto, Kenji Tateishi, and Toshikazu Fukushima, Collecting Evaluative Expressions for Opinion Extraction, Journal of Natural Language Processing, Vol. 12, No. 3, pp. 203-222, 2005).

FIG. 6 illustrates a score table in which a response variable "guide" has been scored for each of visitors to Japan. As illustrated in FIG. 6, the score is calculated on the basis of a number of an extracted word appearing in the guide data and the travel agency data, and an evaluation reference (P=1, N=−1). For example, guide A has a score of 8, which is a high evaluation for an associated visitor to Japan A (China). Meanwhile, guide F has a score of −1, which is a low evaluation (negative evaluation) for an associated visitor to Japan F (Canada). The data pertaining to visitors to Japan indicated in FIG. 6 serves as the "explaining variables", the scored guide data serves as the response variables, and a prediction model can be generated by inputting these variables into the machine learning unit 15 (a machine learning framework).

Next, the travel suitability predicting apparatus generates an explaining variable from the pre-text analysis guide data, as illustrated in FIG. 4. The guide data is constituted by information such as traveler information, guide information, tour execution information, and so on. This information is recorded as text data in a guide report, business report, or the like after a tour, for example. The explaining variables are information constituting the guide data and information that has not been converted to text. Specifically, nationality, age, gender, group makeup, preferences, number of visits, lodgings, dietary restrictions, and so on can be given as examples of the traveler information. Gender, age, guide interpreter qualifications, when qualifications were obtained, number of tours guided overall, and so on can be given as examples of the guide information. Tours, spots, guide dates and times, tour times, weather, temperature, spot evaluations, amount of money spent, consumables, services, and so on at the spots can be given as examples of the tour execution information. The explaining variables can be generated by, for example, detecting, from past data of the aforementioned examples of the explaining variables, information resulting in the greatest tour success (i.e., the highest score). The travel suitability predicting apparatus can generate explaining variables having a high impact on tour success by adding a feature flag to the detected information, for example.

As illustrated in FIG. 4, a spot classification may be added to the response variable (e.g., guide data having a positive-negative label for each tour). The "spot classification" is a classification that describes a spot. Adding a spot classification will be described using "Meiji Shrine" as an example of a spot. When adding a spot classification, words are extracted by carrying out morphological analysis on a descriptive passage of Meiji Shrine. A word aside from "Meiji Shrine", which is the same of the spot, that appears frequently in the extracted words (e.g., "shrine" or the like) is then added as the spot classification. The descriptive passage may be information obtained from a website, for example, and a plurality of descriptive passages may be obtained.

Although not illustrated, open data may also be added to the explaining variables as additional information. "Open data" is data that can be freely collected from websites, for example, and includes the date and time, weekdays or holidays, local weather, local temperature, length of the day (sunrise and sunset times), and so on at the time of the tour execution. This open data is sometimes useful as explaining variables.

As illustrated in FIG. 4, the prediction model can be generated by inputting the response variables and explaining variables into a machine learning framework (e.g., random forests). An open source framework may be used as the machine learning framework. Additionally, a recommendation function may be employed, as illustrated in FIG. 4. Collaborative filtering can be given as an example of the recommendation function. The travel suitability predicting apparatus (simulator) provided with the recommendation function and the prediction model is then generated. When data pertaining to an explaining function is input, the travel suitability predicting apparatus (simulator) predicts (simulates) a suitability and outputs a simulation (prediction) result. At this time, the simulation result is output with the suitability having been ranked by the recommendation function.

Figure 7:
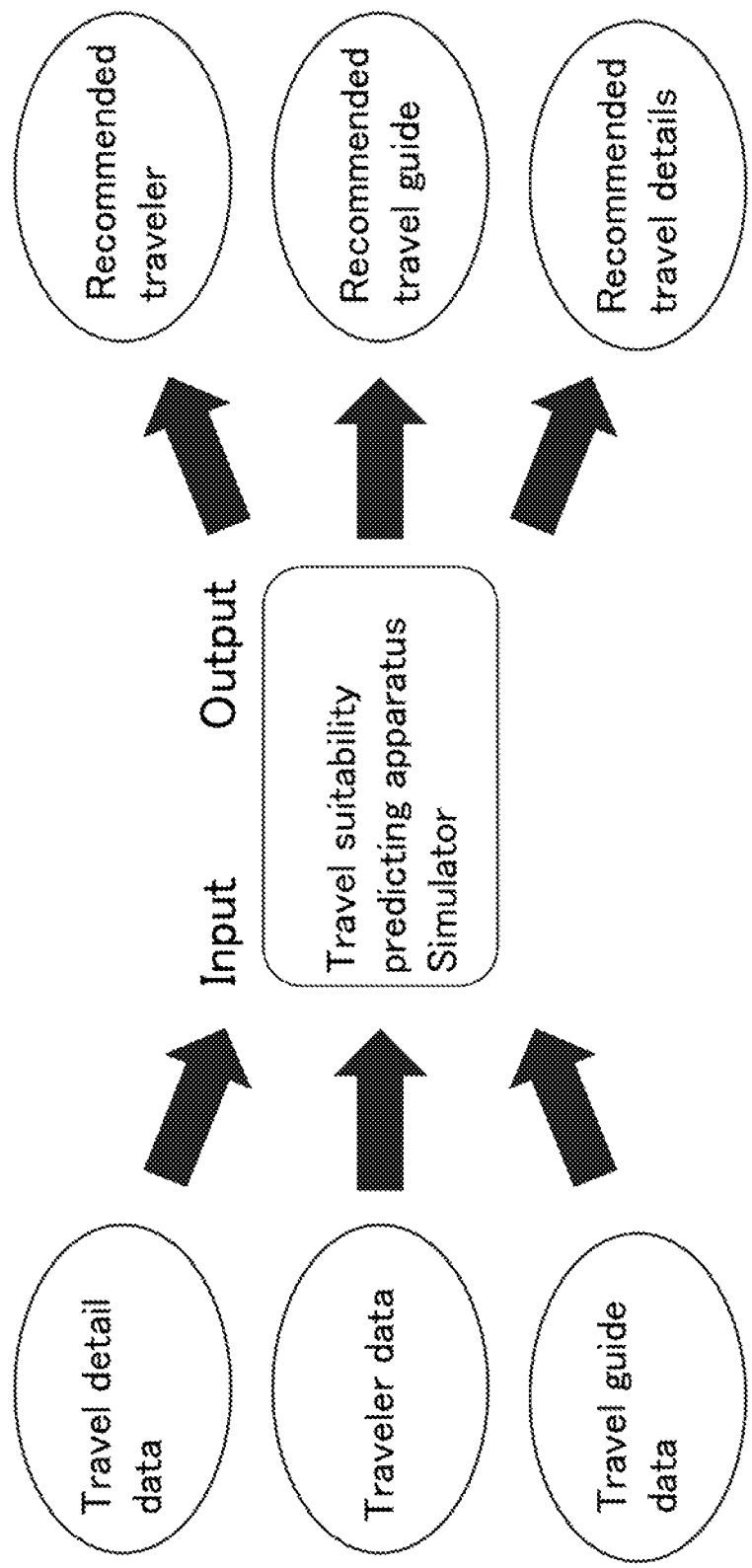
FIG. 7 is a schematic diagram illustrating an example of predicting a suitability from a prediction model in the apparatus according to Example Embodiment 2.

If, for example, at least one of travel detail data, traveler data, and travel guide data is taken as the response variable, other data is taken as the explaining variables, and three respective instances of machine learning are carried out, the prediction model generating apparatus generates three prediction models. If the three prediction models are then provided in the travel suitability predicting apparatus, a three-direction prediction (simulation) can be made, as illustrated in FIG. 7. With the travel suitability predicting apparatus according to this example, for example, if travel detail data is input, at least one of a recommended traveler and a recommended travel guide is output; if traveler data is input, at least one of recommended travel details and a recommended travel guide is output; and if travel guide data is input, at least one of a recommended traveler and recommended travel details is output. Thus the travel suitability predicting apparatus according to this example can be used effectively by travelers, travel guides, and travel providers (travel agencies).

Figure 8:
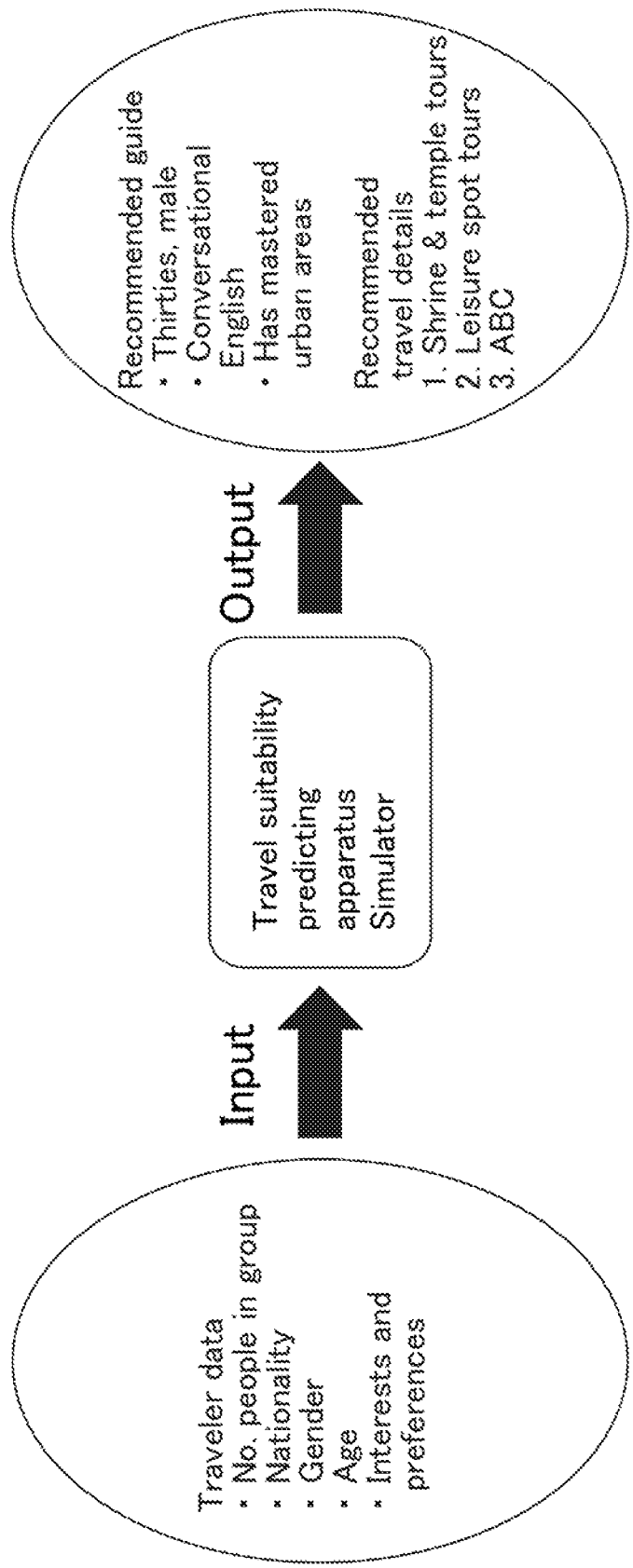
FIG. 8 is a schematic diagram illustrating an example of predicting a suitability from a prediction model in the apparatus according to Example Embodiment 2.

FIG. 8 is an example in which traveler data has been input as the input data. Nationality, usable languages, gender, age, interests and preferences, the number of travelers, whether or not the traveler is accompanied by children, number of visits to Japan, dietary restrictions, the hotel at which the traveler will stay, and so on can be given as examples of the traveler data. The traveler data may be text data written in a guide report or the like, for example. If the traveler data is input to the travel suitability predicting apparatus, a recommended guide and recommended travel details are output.

Figure 9:
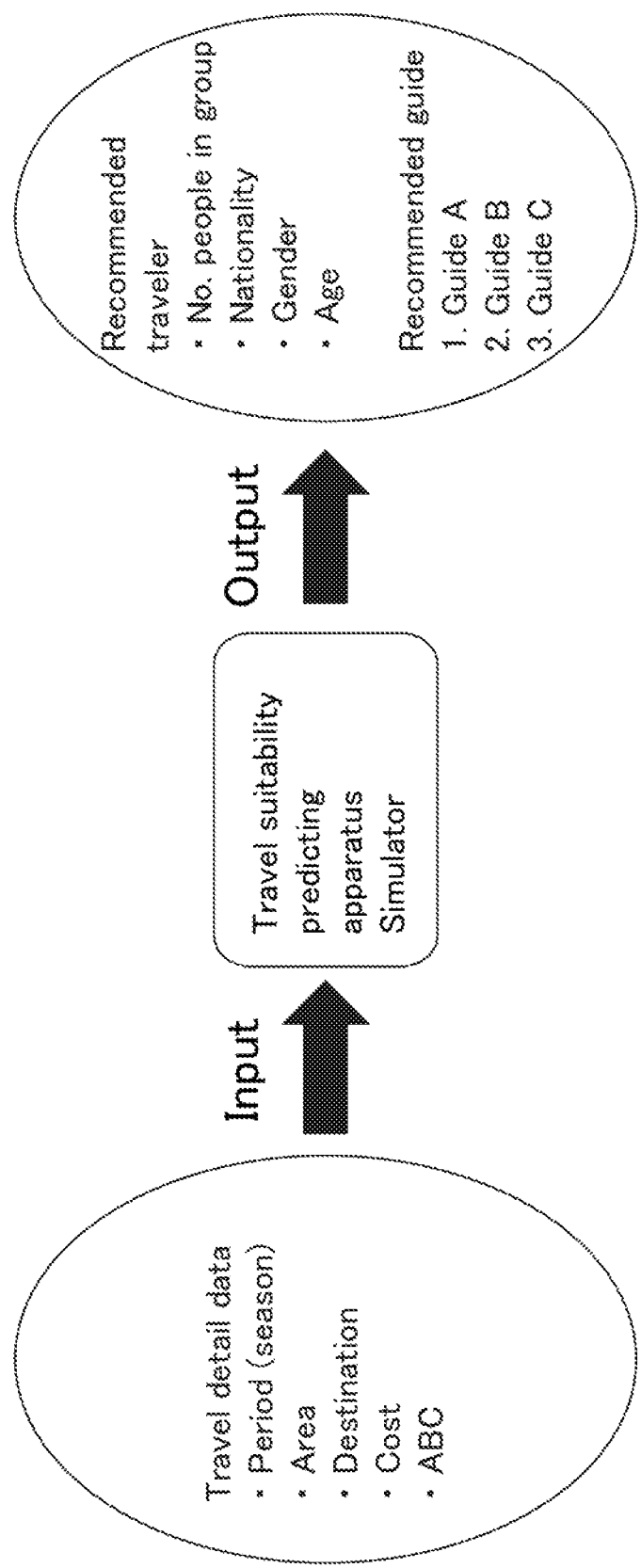
FIG. 9 is a schematic diagram illustrating an example of predicting a suitability from a prediction model in the apparatus according to Example Embodiment 2.

FIG. 9 is an example in which travel detail data has been input as the input data. A sightseeing route, sightseeing areas, destinations, costs, weather, guide spot reviews, the number of reviews from other guides, the day of the guidance, the season of the guidance, the time taken to determine the guide following a request, and so on can be given as examples of the travel detail data. The travel detail data may be text data written in a guide report or the like, for example. If the travel detail data is input to the travel suitability predicting apparatus, a recommended traveler and a recommended travel guide are output.

Figure 10:
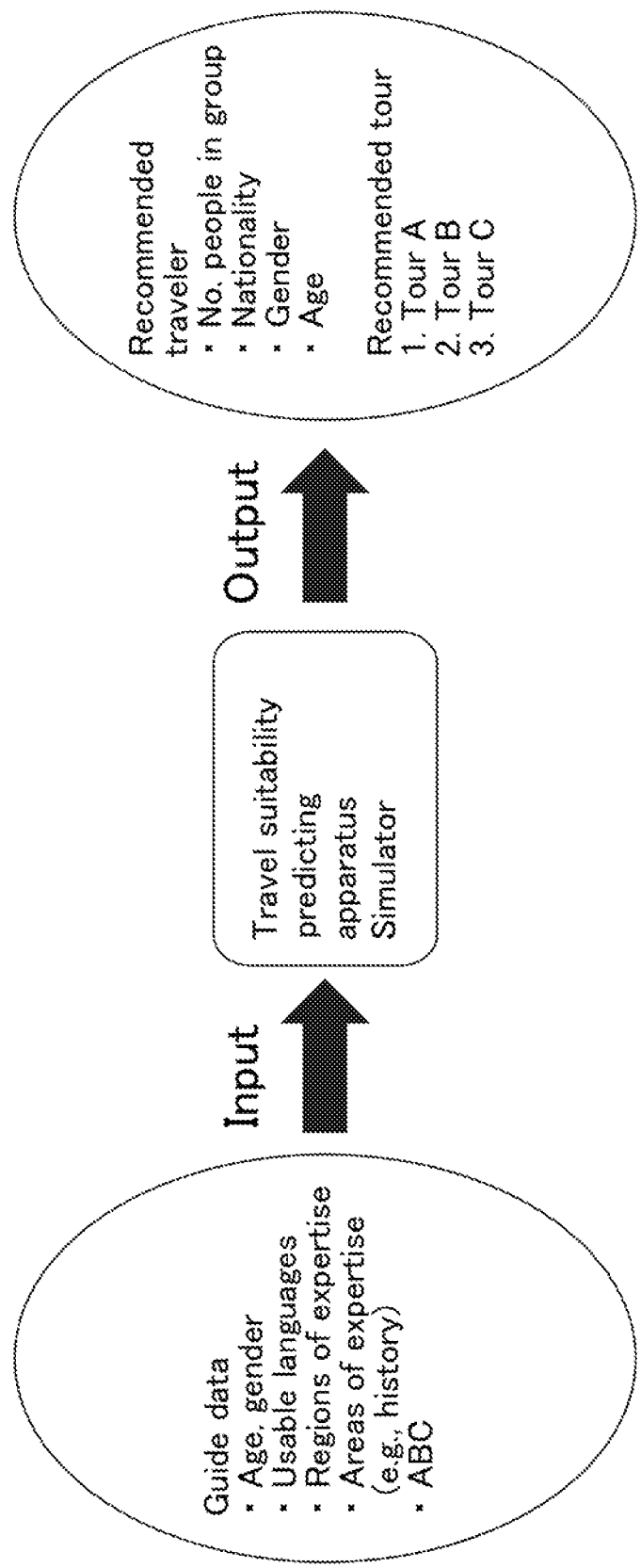
FIG. 10 is a schematic diagram illustrating an example of predicting a suitability from a prediction model in the apparatus according to Example Embodiment 2.

FIG. 10 is an example in which guide data has been input as the input data. Gender, age, number of tours guided each year, guide experience, usable languages, regions the guide knows well, fields of expertise (e.g., history), whether or not the guide has guide interpreter qualifications, when qualifications were obtained, number of tours guided overall, and so on can be given as examples of the guide data. The guide data may be text data written in a guide report or the like, for example. If the guide data is input to the travel suitability predicting apparatus, a recommended traveler and recommended travel details are output.

FIG. 11 illustrates the details of a recommendation in a prediction result output by the travel suitability predicting apparatus according to this example. As illustrated in FIG. 11, recommended guides are ranked from first to fifth, and recommended spots (destinations) are ranked from first to fifth for each of the recommended guides.

It will be obvious to those having skill in the art that many changes may be made in the above-described details of the particular aspects described herein without departing from the spirit or scope of the invention as defined in the appended claims.

Supplementary Notes

The whole or part of the exemplary embodiments disclosed above can be described as, but not limited to, the following supplementary notes.

(Supplementary Note 1)

A prediction model generating apparatus includes a data obtaining unit, a variable group classifying unit, a variable scoring unit, a variable input unit, and a machine learning unit, wherein the data obtaining unit obtains data, the variable group classifying unit classifies the data into a plurality of variable groups, the variable scoring unit scores the data of at least one of the plurality of variable groups by associating that data with the data of another group, the variable input unit takes the data of the scored group as a response variable, and the data of the other group associated with the scored group as an explaining variable, and inputs those data to the machine learning unit, the machine learning unit generates, through machine learning, a prediction model predicting the response variable from the explaining variable.

(Supplementary Note 2)

The prediction model generating apparatus according to Supplemental Note 1, wherein the variable scoring unit includes a word-level evaluation reference table and word extraction counting unit, the word-level evaluation reference table includes a level evaluation reference for each of words, the data obtaining unit obtains text data as the data, the variable group classifying unit classifies the text data into a plurality of variable groups, the word extraction counting unit extracts, from the text data in the variable groups, a word that is the same as a word in the word-level evaluation reference table, and counts the number of the extracted word, and the variable scoring unit scores the data of the group on the basis of the counted number of the extracted word and the level evaluation reference in the word-level evaluation reference table.

(Supplementary Note 3)

The prediction model generating apparatus according to Supplementary Note 2, wherein the word extraction counting unit extracts, from the text data in the variable groups, a word in the word-level evaluation reference table and a word that is the same as a synonym of the word, and counts the number of the extracted word.

(Supplementary Note 4)

The prediction model generating apparatus according to any one of Supplementary Notes 1 to 3, wherein the variable scoring unit includes a word-level evaluation reference table generating unit, the word-level evaluation reference table generating unit uses morphological analysis to break down a plurality of Japanese text data obtained by the data obtaining unit into words, and extracts a word that is the same as a word included in a Japanese sentiment polarity dictionary (volume of terms), and associates the extracted word with evaluation information for the word in the Japanese sentiment polarity dictionary in a table.

(Supplementary Note 5)

The prediction model generating apparatus according to any one of Supplementary Notes 1 to 4, wherein the data obtained by the data obtaining unit is travel detail data, traveler data, and travel guide data, and the variable group classifying unit classifies the travel detail data as a travel detail variable, classifies the traveler data as a traveler variable, and classifies the travel guide data as a travel guide variable.

(Supplementary Note 6)

A travel suitability predicting apparatus including a prediction model generated by the prediction model generating apparatus according to Supplementary Note 5, wherein the apparatus predicts a suitability of at least two of travel details, a traveler, and a travel guide.

(Supplementary Note 7)

The travel suitability predicting apparatus according to Supplementary Note 6, further including a recommending unit.

(Supplementary Note 8)

A prediction model generating method including a data obtaining step, a variable group classifying step, a variable scoring step, a variable input step, and a machine learning step, wherein the data obtaining step obtains data, the variable group classifying step classifies the data into a plurality of variable groups, the variable scoring step scores the data of at least one of the plurality of variable groups by associating that data with the data of another group, the variable input step takes the data of the scored group as a response variable, and the data of the other group associated with the scored group as an explaining variable, and inputs those data to a machine learning unit, and the machine learning step generates, through machine learning, a prediction model predicting the response variable from the explaining variable.

(Supplementary Note 9)

The prediction model generating method according to Supplementary Note 8, wherein the variable scoring step includes a word extraction counting step using a word-level evaluation reference table, the word-level evaluation reference table includes a level evaluation reference for each of words, the data obtaining step obtains text data as the data, the variable group classifying step classifies the text data into a plurality of variable groups, the word extraction counting step extracts, from the text data in the variable groups, a word that is the same as a word in the word-level evaluation reference table, and counts the number of the extracted word, and the variable scoring step scores the data of the group on the basis of the counted number of the extracted word and the level evaluation reference in the word-level evaluation reference table.

(Supplementary Note 10)

The prediction model generating method according to Supplementary Note 9, wherein the word extraction counting step extracts, from the text data in the variable groups, a word in the word-level evaluation reference table and a word that is the same as a synonym of the word, and counts the number of the extracted word.

(Supplementary Note 11)

The prediction model generating method according to any one of Supplementary Notes 8 to 10, wherein the variable scoring step includes a word-level evaluation reference table generating step, the word-level evaluation reference table generating step uses morphological analysis to break down a plurality of Japanese text data obtained in the data obtaining step into words, and extracts a word that is the same as a word included in a Japanese sentiment polarity dictionary (volume of terms), and associates the extracted word with evaluation information for the word in the Japanese sentiment polarity dictionary in a table.

(Supplementary Note 12)

The prediction model generating method according to any one of Supplementary Notes 8 to 11, wherein the data obtained in the data obtaining step is travel detail data, traveler data, and travel guide data, and the variable group classifying step classifies the travel detail data as a travel detail variable, classifies the traveler data as a traveler variable, and classifies the travel guide data as a travel guide variable.

(Supplementary Note 13)

A travel suitability predicting method including predicting a suitability of at least two of travel details, a traveler, and a travel guide using a prediction model generated through the prediction model generating method according to Supplementary Note 12.

(Supplementary Note 14)

The travel suitability predicting method according to Supplementary Note 13, further including a recommending step.

(Supplementary Note 15)

A program configured to execute the method according to any one of Supplementary Notes 8 to 14

(Supplementary Note 16)

A computer-readable recording medium in which is recorded the program according to Supplementary Note 15.

The invention claimed is:

1. A prediction model generating apparatus comprising:
   one or more memories storing instructions; and
   at least one processor configured to execute the instructions to:
   obtain data comprising travel detail data, traveler data, and travel guide data, wherein, the travel guide data is text data of reports prepared by travel guides,
   classify the data into a plurality of variable groups by classifying the travel detail data as a travel detail variable, classifying the traveler data as a traveler variable, and classifying the travel guide data as a travel guide variable, score the data of at least one of the plurality of variable groups by associating that data with the data of another group, take the data of the scored group as a response variable and the data of the other group associated with the scored group as an explaining variable, and input those data to machine learning, and generate, through the machine learning, a prediction model predicting the response variable from the explaining variable.

2. The prediction model generating apparatus according to claim 1, wherein the processor is further configured to execute the instructions to:

include a word-level evaluation reference table that includes a level evaluation reference for each of words, obtain text data as the data, classify the text data into the plurality of variable groups, extract, from the text data in the plurality of variable groups, a word that is the same as a word in the word-level evaluation reference table, and count the number of the extracted words, and score the data of the group on the basis of the counted number of the extracted word and the level evaluation reference in the word-level evaluation reference table.

3. The prediction model generating apparatus according to claim 2, wherein the processor is further configured to execute the instructions to:

extract, from the text data in the plurality of variable groups, a word in the word-level evaluation reference table and a word that is the same as a synonym of the word, and count the number of the extracted words.

4. The prediction model generating apparatus according to claim 1, wherein the processor is further configured to execute the instructions to:

use morphological analysis to break down a plurality of Japanese text data obtained into words, and extract a word that is the same as a word included in a Japanese sentiment polarity dictionary (volume of terms), and associate the extracted word with evaluation information for the word in the Japanese sentiment polarity dictionary in a table.

5. The prediction model generating apparatus according to claim 1, wherein the at least one processor is further configured to execute the instructions to predict a suitability of at least two of travel details, a traveler, and a travel guide by the prediction model.

6. The prediction model generating apparatus according to claim 5, wherein the processor is further configured to execute the instructions to generate a recommendation.

7. A prediction model generating method comprising:

obtaining data comprising travel detail data, traveler data, and travel guide data, wherein, the travel guide data is text data of reports prepared by travel guides, classifying the data into a plurality of variable groups by classifying the travel detail data as a travel detail variable, classifying the traveler data as a traveler variable, and classifying the travel guide data as a travel guide variable, scoring the data of at least one of the plurality of variable groups by associating that data with the data of another group, taking the data of the scored group as a response variable, and the data of the other group associated with the scored group as an explaining variable, and inputs those data to machine learning, and generating, through the machine learning, a prediction model predicting the response variable from the explaining variable.

8. The prediction model generating method according to claim 7, further comprising:

obtaining text data as the data, classifying the text data into the plurality of variable groups, extracting, from the text data in the variable groups, a word that is the same as a word in a word-level evaluation reference table, and counting the number of the extracted words, the word-level evaluation reference table including a level evaluation reference for each of words, and scoring the data of the group on the basis of the counted number of the extracted word and the level evaluation reference in the word-level evaluation reference table.

9. The prediction model generating method according to claim 8, further comprising extracting, from the text data in the plurality of variable groups, a word in the word-level evaluation reference table and a word that is the same as a synonym of the word, and counts the number of the extracted word.

10. The prediction model generating method according to claim 7, further comprising:

using morphological analysis to break down a plurality of Japanese text data obtained into words, and extracting a word that is the same as a word included in a Japanese sentiment polarity dictionary (volume of terms), and associating the extracted word with evaluation information for the word in the Japanese sentiment polarity dictionary in a table.

11. The prediction model generating method according to claim 7, further comprising:

predicting a suitability of at least two of travel details, a traveler, and a travel guide using the prediction model.

12. The prediction model generating method according to claim 11, further comprising generating a recommendation.

13. A non-transitory computer-readable recording medium comprising a program; wherein the program is configured to execute a prediction model generating method comprising:

obtaining data comprising travel detail data, traveler data, and travel guide data, wherein, the travel guide data is text data of reports prepared by travel guides, classifying the data into a plurality of variable groups by classifying the travel detail data as a travel detail variable, classifying the traveler data as a traveler variable, and classifying the travel guide data as a travel guide variable, scoring the data of at least one of the plurality of variable groups by associating that data with the data of another group, taking the data of the scored group as a response variable, and the data of the other group associated with the scored group as an explaining variable, and inputs those data to machine learning, and generating, through the machine learning, a prediction model predicting the response variable from the explaining variable.

\* \* \* \* \*